United States Patent [19]

Smith

[11] Patent Number: 4,548,290

[45] Date of Patent: Oct. 22, 1985

[54] ROAD WHEEL MOUNTING ASSEMBLY

[75] Inventor: Roger R. Smith, Lapeer County, Mich.

[73] Assignee: The United States of America as represented by the Secretary of the Army, Washington, D.C.

[21] Appl. No.: 619,260

[22] Filed: Jun. 11, 1984

[51] Int. Cl.$^4$ .............................................. B62D 55/00
[52] U.S. Cl. ................... 180/9.1; 89/40.03; 180/9.21; 280/664; 280/684; 280/700
[58] Field of Search ............... 180/9.1, 9.21; 280/664, 280/684, 700; 89/40.03, 36.08

[56] References Cited

U.S. PATENT DOCUMENTS

| | | | |
|---|---|---|---|
| 3,246,716 | 4/1966 | Kozicki | 280/664 |
| 3,317,204 | 5/1967 | Maennig et al. | 180/9.1 |
| 3,913,939 | 10/1975 | Sinclair et al. | 180/9.1 |

OTHER PUBLICATIONS

FMC Corporation, "Armored Infantry Fighting Vehicle," 12-17-1975.

Primary Examiner—Albert J. Makay
Assistant Examiner—Steven E. Warner
Attorney, Agent, or Firm—Peter A. Taucher; Gail S. Soderling; Robert P. Gibson

[57] ABSTRACT

An improved road wheel mounting structure. The mounting device comprises a torsion bar fastened a one end to a vehicle hull. The outboard end of the torsion bar is rotatably supported within a sleeve and is connected to a hub. The hub is fastened to a road wheel arm by means of a plurality of the fasteners in such a manner that normal motion of the road wheel causes a rotation of the torsion bar. But an explosive force applied to the road wheel would rupture the fasteners before a significant bending motion is applied to the torsion bar.

11 Claims, 1 Drawing Figure

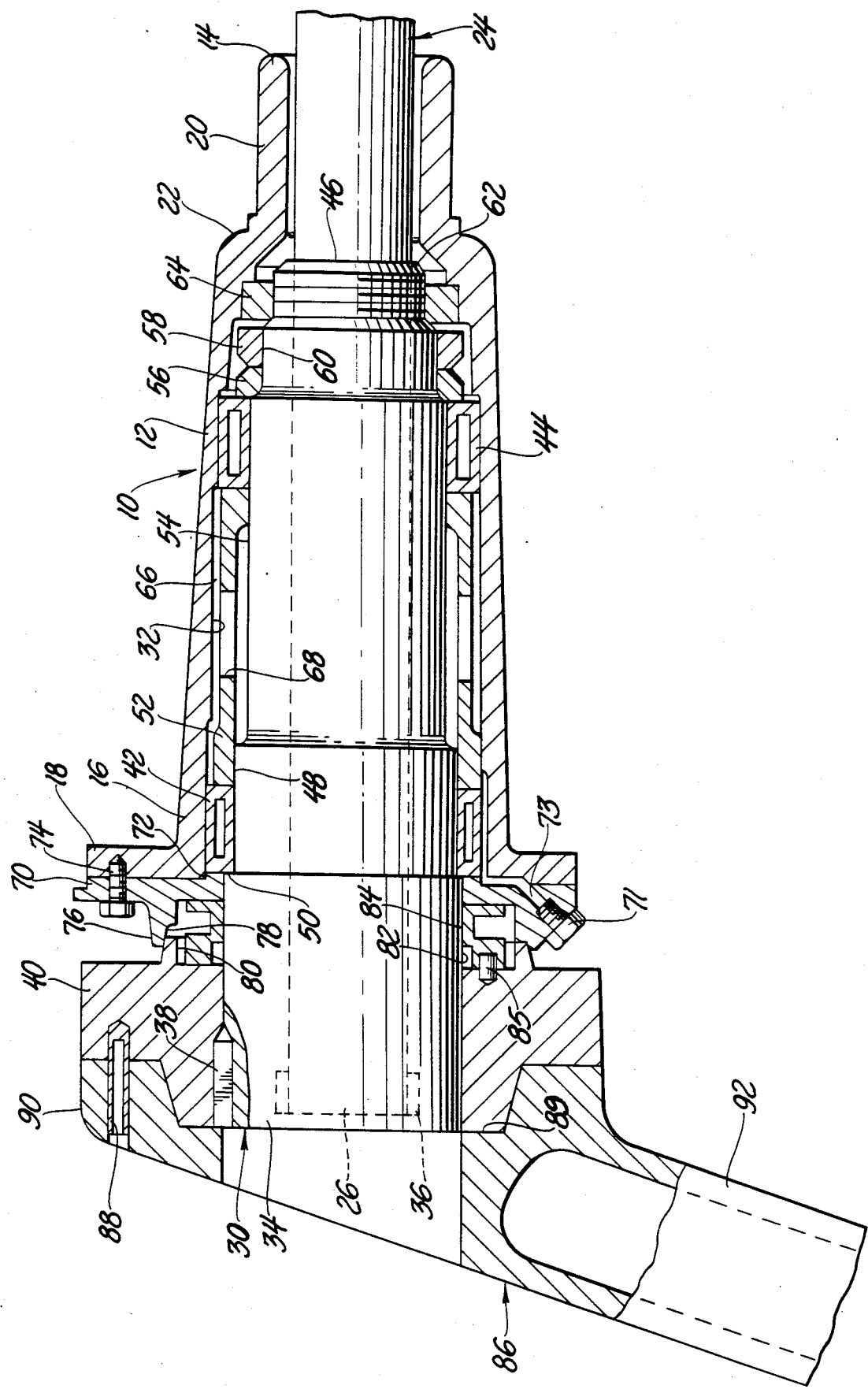

ROAD WHEEL MOUNTING ASSEMBLY

GOVERNMENT INTEREST

The invention described herein may be manufactured, used, and licensed by or for the Government for governmental purposes without payment to me of any royalty thereon.

BACKGROUND OF THE INVENTION

In one aspect this invention relates to the mounting of wheels on vehicles. In a further aspect this invention relates to the mounting of wheels which are a portion of a track laying system.

Vehicles which are track laying vehicles generally have an endless track which is constantly driven in the direction the vehicle is to move. The upper portion of the track is supported on a series of idler wheels and the track is driven by a driving wheel or cog. The lower portion of the track is contacted by the vehicles road wheels which support the vehicle as the vehicle moves over the terrain. The road wheels are attached to the vehicles' hull by means of a road wheel arm and rotate freely on an axle through the wheel's center. The road wheel arm has one end connected to the road wheel axle and the other end connected to a torsion bar. The torsion bar is rigidly mounted to the vehicle hull at the end of the bar distal the end attached to the road wheel arm. Generally the road wheel axle is mounted below the point where the torsion bar is attached to the hull. The resulting axle-road arm-torsion bar structure is similar to a crank with one arm of the crank rigidly fixed to the vehicle hull. When the road wheel moves vertically the road wheel arm will move vertically in a plane perpendicular to the longitudinal axis of the torsion bar thereby applying a torsional force to the end of the torsion bar attached to the road arm. Since the other end of the bar is fixed to the hull, the bar resists the torsional force providing a spring like action as is well known in the torsion bar art.

The torsion bar system has proved to be a good method of attaching road wheels to the hull of track laying vehicles. However such vehicles are subject to the application of explosive upward forces to the tread such as when the vehicle drives over a mine or strikes a similar explosive device. Such explosive forces cause sufficient damage to the road wheel to require replacement of the road wheel.

The explosive forces applied to the track generally cause a substantial bending force to be applied to the road wheel arm at an angle to the plane in which the road wheel arm normally moves. The resulting bending moment when transmitted to the torsion bar causes a permanent deformation in the torsion bar. Because the torsion bar is located within a support structure, a bend in the bar makes repair and replacement difficult and requires that the entire road wheel mounting assembly to be removed from the hull to effect a repair.

It would be desirable to provide a road wheel assembly with a mounting structure which allows vertical movement of the wheel in a plane transverse to the torsion bar axis but which will fail at a location between the road wheel and the torsion bar to prevent torsion bar bending or failure. This will decrease the time necessary to repair a damaged road wheel assembly and obviate the need to remove the entire mounting from the hull. Such a structure would allow road wheel repair under field conditions and with a minimum of tools.

SUMMARY

Briefly, this invention comprises a mounting assembly suitable for supporting a road wheel associated with a track laying vehicle. The assembly includes a sleeve which is rigidly attached to the hull of the track laying vehicle and has a free end which extends outward from the hull. A torsion bar is mounted coaxially within the sleeve with one end firmly attached to the hull and a second end extending outward beyond the sleeve. A hollow spindle is located between the sleeve and the torsion bar to rotatably support the torsion bar. The spindle has one end attached to the second end of the torsion bar and the other end is supported by bearings interposed between the sleeve and the torsion bar so the spindle is free to rotate within the sleeve. A hub is rigidly attached to the spindle at the end of the spindle extending from the sleeve so that rotational forces applied to the hub are transferred to the torsion bar.

A road wheel arm has one end attached to the hub in a manner so that rotational forces applied to the road arm in the plane transverse to the longitudinal axis of the torsion bar are transmitted to the torsion bar. If a bending moment from a force is applied so that it creates a substantial moment at an angle to the plane transverse to the torsion bars axis, the hub and road wheel arm will separate preventing damage to the torsion bar.

BRIEF DESCRIPTION OF DRAWING

In the accompanying drawing, the FIGURE is a partial section through a road wheel mounting assembly according to this invention.

DETAILED DESCRIPTION

The drawing shows a mounting assembly 10 which is adapted to mount a road wheel (not shown) on a track laying vehicle (not shown). The term outboard when applied to components of the assembly refer to the portion of the component furthest from the vehicle hull and inboard refers to the portion of the component nearest the hull. The mounting assembly 10 has a sleeve 12 which has a first end 14 which is adapted to engage the hull of the track laying vehicle and be rigidly mounted to the hull. The sleeve's first end 14 has a reduced diameter section 20 with a shoulder 22 to allow the sleeve 12 to be inserted into a corresponding mounting bracket on the hull. The sleeve 12 will extend outward away from the hull in a substantially horizontal direction and terminates in a second free end 16 separated from the hull. As shown, the second end 16 of the sleeve 12 has a flange 18 extending perpendicularly outward from the sleeve to provide an attachment flange. The sleeve 12 has an interior configuration with steps on the interior to provide mounting steps for various bearings and spacers which will be discussed in detail hereinafter.

The spring action for the road wheel is provided by a torsion bar 24 which extends longitudinally and coaxially within the sleeve 12. The torsion bar 24 has a first end (not shown) fastened to the vehicle so that the first end of the torsion bar will not rotate. One method of mounting the torsion bar to the vehicle is to spline the first end of the torsion bar and provide the mounting means on the vehicle with complimentary splines so that the first end of the torsion bar is rigidly mounted with respect to rotation. However, the torsion bar can be inserted and withdrawn to change torsion bars. The mounting means for attaching the torsion bar to the vehicle hull is well known in the art and a full description is not necessary. Other mounting structures and configurations which would allow a torsion bar to be inserted longitudinally through the sleeve and locked to prevent rotation such as hexagonal shaped ends and complimentary brackets are known in the art.

The torsion bar extends longitudinally through the reduced section 20 of the sleeve and terminates at a second rotating end 26 which extends beyond the free end of the sleeve 12. As shown, the rotating end 26 of the torsion bar 24 has splines which can be engaged so as to rotate the torsion bar about its longitudinal axis. While the torsion bar 24 is free to rotate in a plane perpendicularly disposed to the longitudinal axis of the torsion bar, the rotating end is mounted so that there is little or no movement of the torsion bar in planes which are perpendicular to the longitudinal axis of the torsion bar under normal operating conditions.

The spring factor of the torsion bar is dependent on the torsion bar's length, diameter and the material from which the bar is formed. The design factors for torsion bars are within the skill of the art and such bars have been designed for and used on track laying vehicles for some time.

The rotating end 26 of the torsion bar 24 is supported by and restrained from bending moments by a hollow spindle 30. The spindle 30 is interposed between the sleeve 12 and torsion bar 24 and is rotatably mounted within bore 32 of the sleeve. A spindle hub end 34 is located outboard from the vehicle hull and fasted such as by splines 36 located on the torsion bar 24 to transmit rotational forces applied to the spindle 30 to the torsion bar. The hub end 34 of the spindle also has external splines 38 which are engaged by a hub 40.

The spindle 30 is mounted with an outboard bearing set 42 located near the sleeve's free end 16 the outboard bearing 42 supporting the spindle and allowing it to rotate freely within the sleeve 12. A second, inboard bearing 44 supports the inboard end 46 of spindle 30. The two bearings 42,44 allow the spindle 30 to rotate freely within the sleeve 12 while resisting bending moments applied to the spindle by external forces. As shown in the drawing, the outboard bearing 42 is mounted on a complimentary step 48 and abutted by a shoulder 50 which serves to restrain lateral motion of the bearing outward. A bearing spacer 52 is mounted circumferentially about the spindle 30 to maintain the outboard bearing 42 in its position on the step 48 and the inboard bearing 44 on a land 54 which has a smaller diameter than step 48. The inboard bearing 44 is retained against the bearing spacer 52 by a pair of annular retaining rings 56,58 disposed on an inboard shoulder 60. The inboard shoulder 60 has a threaded portion 62 and a retaining nut 64 as shown. The entire spindle and bearing assembly can be assembled by sliding the outboard bearing 42, bearing spacer 52, bearing 44 and annular retaining rings 56,58 on the spindle and then tightening the retaining nut. The resulting assembly can then be placed inside the sleeve 12 as a unit.

The space between the spindle 30 and sleeve 12 forms a lubrication chamber 66 and apertures 68 allow the free movement of lubricant from the outer to the inner portion of the chamber.

An annular retaining plate 70 is disposed at and attached to the flange 18 of the sleeve 12. The plate 70 has a drain plug 71 therein and a drain channel 73 communicating with the chamber 66 to allow the changing of lubricant in the road wheels mounting assembly 10. The retaining plate 70 has a projecting lip 72 disposed about the inner circumferance of the annular retaining plate which projects inward into the sleeve 12 and contacts the outermost edge of the outboard bearing 42. The retaining plate serves to hold the sleeve 30 and associated bearings 42,44 within the sleeve. The retaining plate 70 is fastened to the sleeve flange 18 by a plurality of threaded fasteners 74, only one of which is shown, circumferentially spaced around the retaining plate and flange. The retaining plate 70 has a shaped ledge 76 extending outward from the retaining plate 70 and having an under cut portion 78 which is adapted to engage a complimentary sill 80 projecting inward from the hub 40. The sill 80 overlaps the shaped ledge 76 extending into the undercut 78 and cooperating with the outer surface of the spindle 30 to form a chamber 82. A sliding C-shaped seal 84 is fastened to the inner surface of hub 40 by fasteners 85. The seal 84 will protect the rotating portion of the assembly from dirt which tries to work its way into the seal and serves to retain lubrication within the lubrication chamber 66. The hub is ordinarily fastened to the spindle by means of a shrink fit. Such an assembly procedure is within the skill of the art.

A road wheel arm 86 is attached to the outboard face of hub 40 by means of a plurality of threaded fasteners 88 disposed in a concentric circle about the longitudinal axis of the torsion bar 24. Functionally stated, the fasteners 88 are strong enough to transmit rotational and bending moments applied to the road wheel arm under normal operating conditions while a sudden explosive type force will cause the fasteners to shear before a force sufficient to cause a permanent deformation is transmitted to the torsion bar 24. Preferably the fasteners are a hollow threaded fastener as shown. Fasteners having a hollow portion are preferred because after rupture the cavity already existing in the fastener allows standard screw extractors to be used in removing the remaining portion of the fasteners without the need for drilling a cavity in the fastener. This expedites repair and decreases the tools needed to effect a repair.

The hub 40 has a frusto-conical projection 89 protruding from the outer surface of the hub and engaged by a complimentary cavity within a hub engaging end 90 of the road wheel arm. The hub engaging end 90 is attached to and rotated by a crank section 92 which terminates in an axle attachment not shown. The axle attachment is known in the art and a full explanation is omitted in the interest of brevity. The road wheel is mounted on an axle for free undriven rotation about the axle. The longitudinal axis of the road wheel axle is generally parallel with the longitudinal axis of the torsion bar. The resulting axle-road wheel arm-torsion bar structure forms a crank type structure where vertical motion by the axle is translated into a rotary motion of the torsion bar. Also the road wheel axle is generally disposed below, that is nearer the ground, than the torsion bar.

I wish it to be understood that I do not desire to be limited to the exact details of construction shown and described for obvious modifications will occur to a person skilled in the art, without departing from the spirit and scope of the appended claims.

What is claimed is:

1. A mounting assembly suitable for supporting a road wheel associated with a track laying vehicle comprising:

a sleeve rigidly attached to the hull of the track laying vehicle, said sleeve extending horizontally from the hull;

a torsion bar coaxially mounted within said sleeve, said torsion bar having a first end rigidly attached to the hull of the vehicle and a second rotating end extending beyond the outboard end of said sleeve;

a spindle interposed between said sleeve and said torsion bar, said spindle surrounding and enclosing the major portion of said torsion bar located within said sleeve, said spindle being attached to said torsion bar so as to transmit rotation applied to the spindle to the torsion bar;

bearing means interposed between the spindle and the sleeve to provide axial-rotation of the spindle and torsion bar relative to the housing;

a hub mounted on the outboard end of said spindle and affixed to rotate therewith;

a road wheel support arm having a hub engaging end juxtaposed said hub and a road wheel engaging end, the road wheel end being adapted to support the axle of the road wheel, said support arm extending substantially perpendicularly from the longitudinal axis of the torsion bar so that the axle is mounted with its axis aligned with the torsion bar at a position removed from said torsion bar so that vertical movement of the axle causes a rotation of the hub engaging end about the axis of the torsion bar; and a plurality of fastening means circumferentially spaced about the hub, holding the hub and the road arm together so that rotational forces applied by road wheel motion are transmitted to the torsion bar as torsional forces, said fasteners being adapted so that explosive bending moments applied to said road arm will cause the fasteners to shear causing the road arm to separate from the hub before the torsion bar is subjected to forces sufficient to cause bending of the bar.

2. The mounting assembly of claim 1 wherein said plurality of fasteners are hollow fasteners.

3. The mounting assembly of claim 1 wherein said plurality of fasteners are hollow externally threaded fasteners which engage a complimentary plurality of threaded apertures formed in said hub.

4. The mounting assembly of claim 1 wherein said bearing means includes a first outboard bearing means mounted near the outboard end of said sleeve and a second inboard bearing means mounted near the end of the inboard end of the spindle, the two bearing means serving to mount the spindle axially within the sleeve to allow rotation while restricting bending types of motion.

5. The mounting assembly of claim 1 where said spindle has a first outboard bearing mounted on a complimentary outer surface of said spindle, and engaging a shoulder on the spindle, a bearing spacer circumferentially disposed about the spindle, an inboard bearing mounted on a complimentary land on the spindle and a fastener adapted to apply a longitudinal force to the bearings and spacer to force the outboard bearing against the shoulder to provide an assembly which can be inserted into the sleeve as a unit.

6. The mounting assembly of claim 5 where said spindle has a threaded inboard end and said fastening means is a complimentary internally threaded fastener.

7. A mounting assembly suitable for supporting a road wheel associated with a track laying vehicle comprising:

a sleeve having a first end rigidly attached to the hull of the track laying vehicle, said sleeve extending horizontally from the hull and terminating in a second free end;

a torsion bar coaxially mounted within said sleeve, said torsion bar having a first splined end rigidly attached to the hull of the vehicle and a second rotating splined end extending beyond the free end of said sleeve;

a hollow spindle interposed between said sleeve and said torsion bar, said spindle surrounding and enclosing the major portion of said torsion bar located within said sleeve, said spindle having a first end located within said sleeve and a second end surrounding and splined to the second end of the torsion bar;

bearing means interposed between the spindle and the sleeve so as to allow free rotation of the spindle and torsion bar relative to the housing about the longitudinal axis of the torsion bar;

a hub having internal splines mounted on the second end of said spindle and adapted to rotate therewith;

a road wheel support arm having a first hub engaging end juxtaposed said hub and a second road wheel engaging end, the road wheel end being adapted to support the axle of the road wheel, said support arm extending perpendicularly from the longitudinal axis of the torsion bar to a point below the horizontal plane of the torsion bar so that the axle is mounted with its axis aligned with the torsion bar at a position lower than and removed from said torsion bar so that vertical movement of the axle causes a rotation of the hub engaging end about the axis of the torsion bar; and fastening means circumferentially spaced about the hub engagingly holding the hub and the road arm together so that rotational forces applied by road wheel motion are transmitted to the torsion bar as torsional forces and said fasteners being hollow so that explosive bending moments applied to said road arm will cause the fasteners to shear causing the road arm to separate from the hub before the torsion bar is subjected to forces sufficient to cause bending of the bar.

8. The mounting assembly of claim 7 wherein said bearing means includes a first outboard bearing means mounted near the outboard end of said sleeve and a second inboard bearing means mounted near the end of the inboard end of the spindle, the two bearing means serving to mount the spindle axially within the sleeve to allow rotation while restricting bending types of motion.

9. The mounting assembly of claim 7 where said spindle has a first outboard bearing mounted on a complimentary outer surface of said spindle, and engaging a shoulder on the spindle a bearing spacer circumferentially disposed about the spindle, an inboard bearing mounted on a complimentary land on the spindle and a fastener adapted to apply a longitudinal force to the bearings and spacer to force the outboard bearing against the shoulder to provide an assembly which can be inserted into the sleeve as a unit.

10. The mounting assembly of claim 9 where said spindle has a threaded inboard end and said fastening means is a complimentary internally threaded fastener.

11. A mounting assembly suitable for supporting a road wheel associated with a track laying vehicle comprising:

a sleeve having a first end rigidly attached to the hull of the track laying vehicle, said sleeve extending horizontally from the hull to a second free end;

a torsion bar coaxially mounted within said sleeve, said torsion bar having a first splined end rigidly attached to the hull of the vehicle and a second rotating splined end extending beyond the free end of said sleeve;

a hollow spindle interposed between said sleeve and said torsion bar, said spindle surrounding and enclosing the major portion of said torsion bar located within said sleeve, said spindle having a first threaded end located within said sleeve and a second end surrounding and splined to the second end of the torsion bar;

bearing means interposed between the spindle and the sleeve so as to allow free rotation of the spindle and torsion bar relative to the housing about the longitudinal axis of the torsion bar said bearing means comprising a first outboard bearing mounted on a complimentary outer surface of said spindle and engaging a shoulder on the spindle, an inboard bearing mounted on a complimentary land on the spindle, a bearing spacer circumferentially disposed about the spindle between the bearings, holding the bearings in a spaced relationship, and fastening means to hold the bearings and spacer on the spindle;

a hub having internal splines mounted on the second end of said spindle and adapted to rotate therewith:

a road wheel support arm having a first hub engaging end juxtaposed said hub and a second road wheel engaging end, the road wheel end being adapted to support the axle of the road wheel, said support arm extending substantially perpendicularly from the longitudinal axis of the torsion bar so that the axle is mounted with its axis aligned with the torsion bar at a position removed from said torsion bar so that vertical movement of the axle causes a rotation of the hub engaging end about the axis of the torsion bar; and hollow fastening means circumferentially spaced about the hub holding the hub and the road arm together so that rotational forces applied by road wheel motion are transmitted to the torsion bar as torsional forces so that explosive bending moments applied to said road arm will cause the fasteners to shear causing the road arm to separate from the hub before the torsion bar is subjected to forces sufficient to cause bending of the bar while the remaining portion of the hollow fastener has a cavity exposed for extraction.

\* \* \* \* \*